(12) United States Patent
Yonemoto

(10) Patent No.: US 7,986,920 B2
(45) Date of Patent: Jul. 26, 2011

(54) IMAGE COMMUNICATION APPARATUS

(75) Inventor: Tomonori Yonemoto, Yokohama (JP)

(73) Assignee: Olympus Corporation, Tokyo (JP)

( * ) Notice: Subject to any disclaimer, the term of this patent is extended or adjusted under 35 U.S.C. 154(b) by 401 days.

(21) Appl. No.: 12/365,438

(22) Filed: Feb. 4, 2009

(65) Prior Publication Data

US 2009/0197526 A1    Aug. 6, 2009

(30) Foreign Application Priority Data

Feb. 5, 2008  (JP) ................... 2008-025655
Jan. 15, 2009  (JP) ................... 2009-006597

(51) Int. Cl.
*H04B 1/00* (2006.01)
(52) U.S. Cl. ..................... 455/69; 455/67.11
(58) Field of Classification Search ........... 455/67.11, 455/67.13, 67.14, 67.7, 69, 84
See application file for complete search history.

(56) References Cited

U.S. PATENT DOCUMENTS 7,202,885 B2 * 4/2007 Motohashi ............. 348/14.02
7,593,746 B2 * 9/2009 Willenegger et al. ....... 455/522
7,782,820 B2 * 8/2010 Dominique et al. ......... 370/334

* cited by examiner

*Primary Examiner* — Jeffrey S Zweizig
(74) *Attorney, Agent, or Firm* — Westerman, Hattori, Daniels & Adrian, LLP

(57) ABSTRACT

An image communication apparatus which can keep any deterioration in picture quality of an image down to the minimum level and which can perform transmission of an image signal of one frame within a predetermined time even in the case where the communication state becomes poor is provided. An imaging module 101 picks up an image of an object to generate an image signal. An image data thinning unit 102 generates an image signal in which data amount is reduced on color space from an image signal which has been generated by the imaging module 101. A communication unit 104 transmits an image signal and receives communication state information indicating a communication state which has been transmitted from the receiving device. A control unit 103 controls the image data thinning unit 102 on the basis of the received communication state information.

6 Claims, 12 Drawing Sheets

FIG. 4
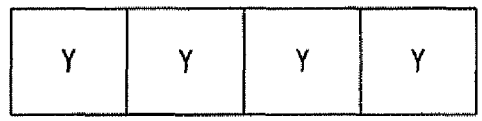
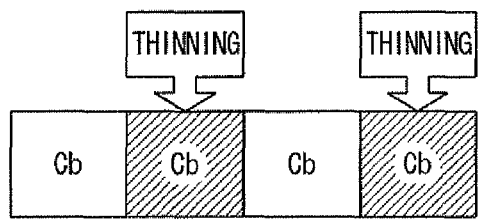
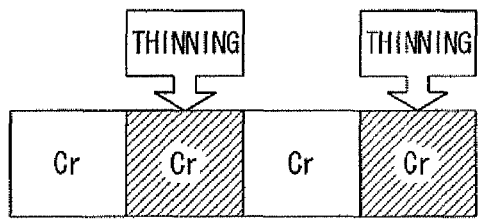
FIG. 5
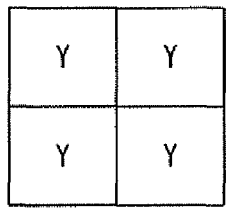 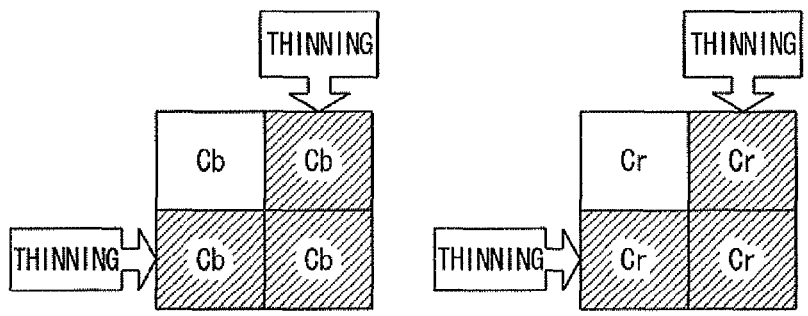

IMAGE COMMUNICATION APPARATUS

BACKGROUND OF THE INVENTION

1. Field of the Invention

The present invention relates to an image communication apparatus including a transmitting device for transmitting an image signal, and a receiving device for receiving an image signal which has been transmitted by the transmitting device.

The present application claims priority of Japanese patent application No. 2008-25655, filed on Feb. 5, 2008, and Japanese patent application No. 2009-6597, filed on Jan. 15, 2009, and the contents of which are incorporated herein by reference.

2. Description of the Related Art

In systems for transmitting and receiving images by wireless, a communication state is changed depending upon the peripheral environment so that a data amount which can be transmitted for unit time varies. In the case where the communication state is deteriorated by the peripheral environment, an error rate of data being transmitted by wireless becomes high so that display of an image based on the data becomes difficult to see. In the Japanese Patent Application, First Publication No. 2002-325074, in order to solve the above-mentioned problem, there is described a technology to perform disposal processing of received data having a high error rate due to deterioration of the communication state to request re-sending of data for the transmitting side so that throughput corresponding to the wireless communication system can be obtained. On the other hand, there is generally carried out an approach to transfer a picked up image as compressed data such as JPEG, etc. in order to shorten the communication time to suppress power consumption in the case of transmitting/receiving image data.

In the technology described in the Japanese Patent Application, First Publication No. 2002-325074, there is employed a configuration to calculate, every frame, an error rate of received image data to perform disposal processing of image data of a corresponding frame in the case where the error rate is a predetermined threshold value or more, and to save image data of one frame into buffer in the case where the error rate is less than the predetermined threshold value, and to display an image on a display unit. Moreover, in the case where disposal processing of image data is performed at a certain frame in order to obtain a desired performance, the image is displayed on the basis of image data of the previous frame saved in buffer. For this reason, in the case where the communication state continues to deteriorate, a display picture is placed in freeze state because image data of the previous frame is used for display at all time. As a result, it becomes impossible to visually recognize images picked up on the real time basis.

On the other hand, in the technology for transferring a picked up image as compressed data such as JPEG, etc., when any error takes place during transfer of compressed data, there are many cases where data undergoes a large amount of damage as an image. As a result, it is required to transfer all data in the state where no error exists. For this reason, there is used a technology to perform transfer of image data in the state divided into small blocks to resend data on a block basis at the time of occurrence of an error. However, in the case where the communication state is deteriorated, the number of packets for which re-transfer is required becomes large, and an error may take place even with re-sending. When the 2nd and 3rd re-transfer operations are sequentially performed, since a time required for transmitting one picture is limited, there are instances where image transfer of one picture is not completed within a predetermined time.

SUMMARY OF THE INVENTION

In consideration of the above-described problems, the present invention has been made and its object is to provide an image communication apparatus adapted for minimizing deterioration in picture quality of an image even in the case where the communication state becomes poor, and to have the ability to perform transmission of an image signal of one frame within a predetermined time.

The present invention has been made in order to solve the above-described problems, and is directed to an image communication apparatus including a transmitting device for transmitting an image signal, and a receiving device for receiving an image signal which has been transmitted by the transmitting device, the transmitting device comprising:

an image pick-up unit (corresponding to imaging module 101 of FIG. 1, imaging module 601 of FIG. 6, imaging module 1201 of FIG. 12) for picking up an image of an object to generate an image signal;

an information receiving unit (corresponding to communication unit 104 of FIG. 1, communication unit 604 of FIG. 6, communication unit 1204 of FIG. 12) for receiving communication state information indicating a communication state which has been transmitted from the receiving device;

a transmitting side signal processing unit (corresponding to image data thinning unit 102 of FIG. 1, Knee processing unit 602 of FIG. 6, Bayer data generating unit 1202 of FIG. 12) for generating an image signal in which data amount is reduced on color space from an image signal which has been generated by the image pick-up unit;

a signal transmitting unit (corresponding to communication unit 104 of FIG. 1, communication unit 604 of FIG. 6, communication unit 1204 of FIG. 12) for transmitting, to the receiving device, an image signal which has been generated by the transmitting side signal processing unit; and a transmitting side control unit (corresponding to control unit 103 of FIG. 1, control unit 603 of FIG. 6, control unit 1203 of FIG. 12) for controlling the transmitting side signal processing unit on the basis of the received communication state information, the receiving device comprising a signal receiving unit (corresponding to communication unit 202 of FIG. 2, communication unit 702 of FIG. 7, communication unit 1302 of FIG. 13) for receiving an image signal which has been transmitted by the transmitting device;

a receiving side signal processing unit (corresponding to image data interpolating unit 204 of FIG. 2, Deknee processing unit 704 of FIG. 7, image data interpolating unit 1304 of FIG. 13) for generating, from the received image signal, an image signal of which the data amount has been restored on the color space;

a communication state detecting unit (corresponding to communication state detecting unit 203 of FIG. 2, communication state detecting unit 703 of FIG. 7, communication state detecting unit 1303 of FIG. 13) for detecting a communication state;

a receiving side control unit (corresponding to control unit 207 of FIG. 2, control unit 706 of FIG. 7, control unit 1307 of FIG. 13) for controlling the receiving side signal processing unit on the basis of the communication state information indicating communication state which has been detected by the communication state detecting unit; and an information transmitting unit (corresponding to communication unit 202 of FIG. 2, communication unit 702 of FIG. 7, communication unit 1302 of FIG. 13) for transmitting the communication state information to the transmitting device.

Moreover, in the image communication apparatus of the present invention, the transmitting side signal processing unit (corresponding to image data thinning unit 102 of FIG. 1) serves to generate an image signal in which one or more pixels are thinned from an image signal which has been generated by the image pick-up unit, and the receiving side signal processing unit (corresponding to image data interpolating unit 204 of FIG. 2) serves to generate an image signal in which the one or more pixels thinned at the transmitting device have been interpolated from a received image signal.

Further, in the image communication apparatus of the present invention, the transmitting side signal processing unit (corresponding to Knee processing unit 602 of FIG. 6) serves to generate an image signal in which the number of data bits has been reduced from an image signal which has been generated by the image pick-up unit, and the receiving side signal processing unit (corresponding to Deknee processing unit 704 of FIG. 7) generates an image signal in which the number of bits, which has been reduced at the transmitting device, is restored from the received image signal.

Further, in the image communication apparatus of the present invention, the transmitting side signal processing unit (corresponding to Bayer data generating unit 1202 of FIG. 12) serves to generate an image signal from which any color signal has been reduced from the plural color signals every pixel from an image signal consisting of plural color signals which have been generated by the image pick-up unit, and the receiving side signal processing unit (corresponding to image data interpolating unit 1304 of FIG. 13) serves to generate an image signal in which the color signal has been reduced at the transmitting device is restored from the received image signal.

Further, in the image communication apparatus of the present invention, the receiving device further comprises: a display unit (corresponding to display unit 206 of FIG. 2, display unit 705 of FIG. 7, display unit 1306 of FIG. 13) for displaying information as an index of the communication state on the basis of the communication state information.

Also, the image communication apparatus of the present invention further comprises a color space transforming unit (corresponding to color space transforming unit 106 of FIG. 1, color space transforming unit 1601 of FIG. 16) for transforming the color space of an image signal generated by the image pick-up unit, wherein the transmitting side signal processing unit generates an image signal in which the data amount is reduced on color space from an image signal in which color space has been transformed by the color space transforming unit.

In accordance with the present invention, since the communication time of data can be reduced by reducing the data amount of an image signal at the transmitting device, there is room for the re-sending of data when a communication error takes place. Thus, even in the case where the communication state becomes poor, it is possible to prevent the loss of image data as much as possible and perform transmission of an image signal of one frame within a predetermined time. Also, by restoring the data amount of an image signal at the receiving device, it is possible to keep any deterioration in picture quality of an image down to the minimum level.

BRIEF DESCRIPTION OF THE DRAWINGS

FIG. 4 is a reference block diagram for explaining thinning processing in the first embodiment of the present invention.

FIG. 5 is a reference block diagram for explaining thinning processing in the first embodiment of the present invention.

DETAILED DESCRIPTION OF THE INVENTION

Preferred embodiments of the present invention will now be described with reference to the attached drawings. In all embodiments which will be described later, it is assumed that an image signal is inputted by an imaging system caused to be of the configuration by using three image sensors in which monochromatic filters of R, Q B colors are respectively attached (hereinafter called "simultaneous processing system of three image sensors").

First Embodiment

First, a first embodiment of the present invention will be described. The image communication apparatus according to this embodiment is composed of a transmitting device for transmitting image signals, and a receiving device for receiving image signals which have been transmitted by the transmitting device. In this embodiment, as a processing for reducing data amount of image signal, a thinning processing for thinning pixels of image signal is performed at transmitting device. Moreover, as a processing for restoring data amount of image signal, an interpolation processing for interpolating thinned pixels at the transmitting device is performed at the receiving device. At the time of conventional JPEG compression, a process for transforming color space into frequency space is performed. On the contrary, the thinning processing of this embodiment is performed with color space of image signal being maintained.

Figure 1:
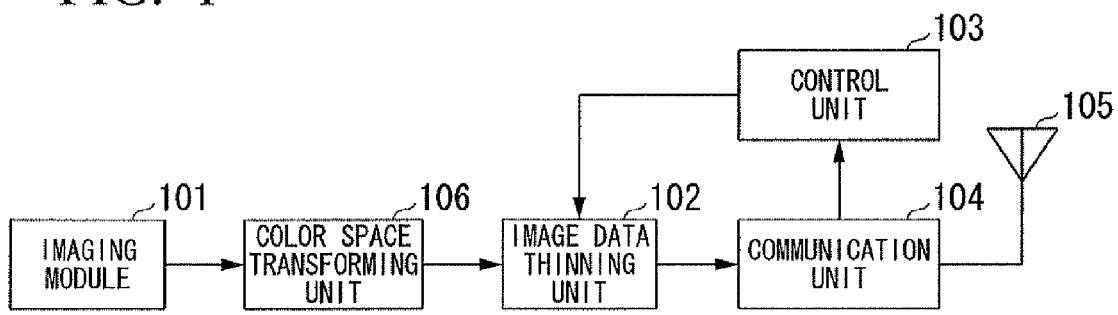
FIG. 1 is a block diagram showing the configuration of a transmitting device that an image communication apparatus according to a first embodiment of the present invention has.

FIG. 1 shows the configuration of the transmitting device. As shown in FIG. 1, the transmitting device comprises an imaging module 101, an image data thinning unit 102, a control unit 103, a communication unit 104, an antenna 105, and a color space transforming unit 106. The imaging module 101 comprises image pick-up devices, and serves to pick up an image of an object to generate an image signal. The color space transforming unit 106 transforms color space of a signal generated by the imaging module 101. The image data thinning unit 102 generates an image signal in which pixels are thinned by thinning processing from an image signal for which color space has been transformed by the color space transforming unit 106. The control unit 103 controls the image data thinning unit 102 in accordance with communication state. The communication unit 104 performs modulation processing of an image signal to be transmitted to the receiving device, and performs demodulation processing of communication state information received from the receiving device. An antenna 105 serves to perform transmission/reception of electric wave to and from the receiving device.

Figure 2:
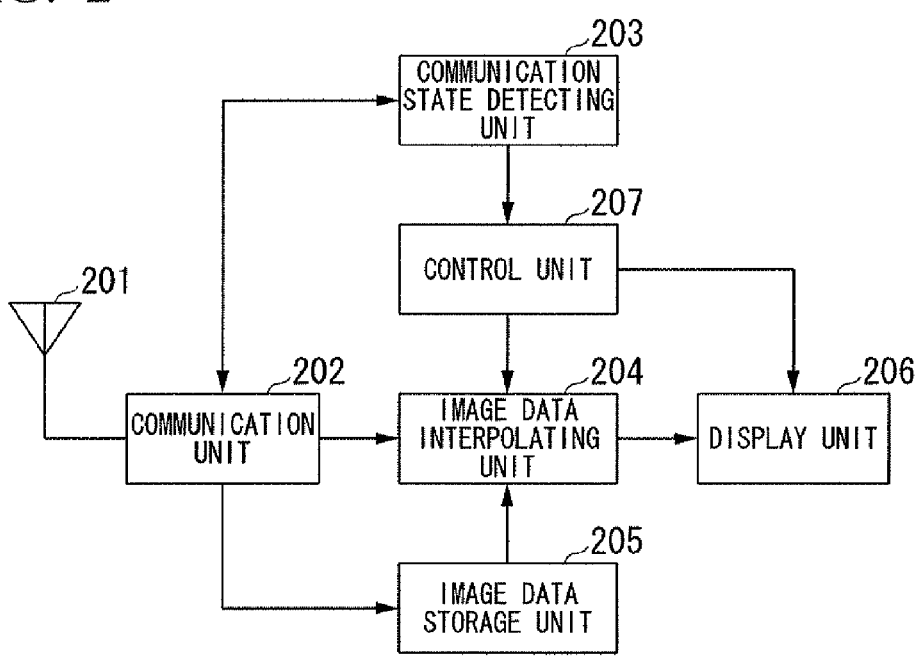
FIG. 2 is a block diagram showing the configuration of a transmitting device that an image communication apparatus according to the first embodiment of the present invention has.

FIG. 2 shows the configuration of the receiving device. As shown in FIG. 2, the receiving device comprises an antenna 201, a communication unit 202, a communication state detecting unit 203, and an image data interpolating unit 204, an image data storage unit 205, a display unit 206, and a control unit 207. The antenna 201 performs transmission/reception of electric wave to and from the transmitting device. The communication unit 202 performs demodulation processing of an image signal received from the transmitting device, and performs modulation processing of communication state information transmitted to the transmitting device. The communication state detecting unit 203 detects communication state on the basis of data added to a received image signal to generate communication state information indicating the content of the communication state. The image data interpolating unit 204 generates an image signal in which pixels thinned at the transmitting device are interpolated from the received image signal. The image data storage unit 205 stores the received image signal. The display unit 206 displays an image on the basis of the image signal in which interpolation of pixels has been performed by the image data interpolating unit 204. The control unit 207 controls image data interpolating unit 204 in accordance with communication state.

Figure 3:
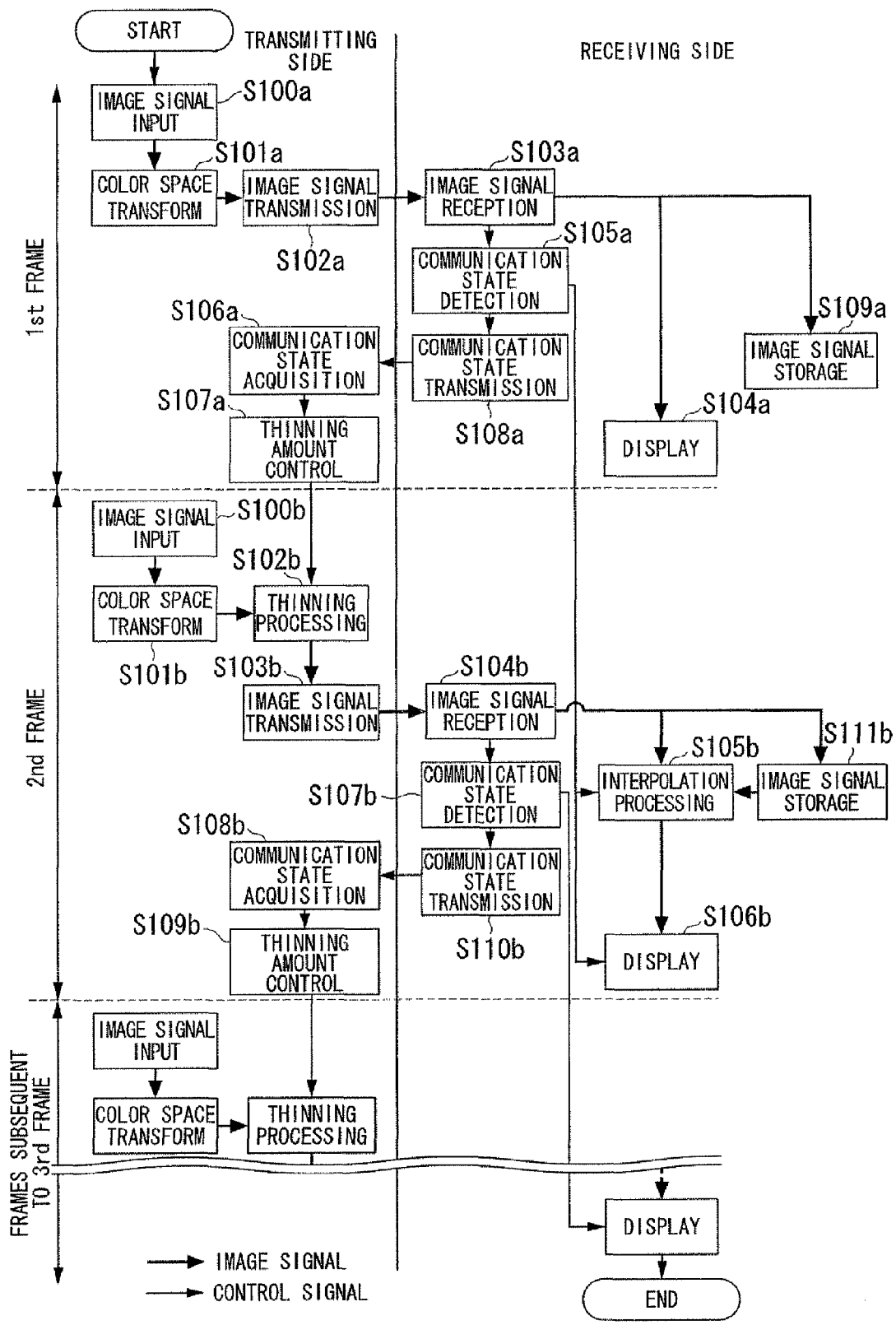
FIG. 3 is a flowchart showing the flow of the image communication apparatus according to the first embodiment of the present invention.

The operation of the image communication apparatus according to this embodiment with now be described. FIG. 3 shows the flow of the operation at the time of image communication. After starting due to Turning ON of power supply in the transmitting device and the receiving device, generation of image signal by the imaging module 101 is started. An image signal (the first frame) of RGB outputted from the imaging module 101 is inputted to the color space transforming unit 106 (image signal input S100a). The image signal inputted to the color space transforming unit 106 is changed into luminance signal and color difference signal (which will be referred to as YCbCr signal), and is inputted to the image data thinning unit 102 (color space transform S101a). For the first frame, the image data thinning unit 102 outputs an image signal to the communication unit 104 without performing thinning processing. The communication unit 104 transmits, to the receiving device, an image signal through the antenna 105 (image signal transmission S102a). In transmitting an image signal, CRC data by the well known technology is added to the image signal in order to detect communication state at the receiving device.

In the receiving device, the communication unit 202 receives, through the antenna 201, an image signal transmitted from the transmitting device (image signal reception S103a). The received image signal is outputted to the image data interpolation unit 204 and the image data storage unit 205. For the first frame, the image data interpolating unit 204 outputs an image signal to the display unit 206 without performing interpolation processing. The display unit 206 displays an image of the first frame on the basis of the image signal (display S104a). Moreover, the image data storage unit 205 stores the image signal (image signal storage S109a).

On the other hand, the communication unit 202 serves to analyze CRC data given to the received image signal to output the analysis result to the communication state detecting unit 203. The communication state detecting unit 203 detects error on the basis of the analysis result to thereby detect communication state to generate communication state information (communication state detection S105a). The communication state information is outputted to the communication unit 202, and is transmitted to the transmitting device by the communication unit 202 (communication state transmission S108a). Moreover, the communication state information is also outputted to the control unit 207. The communication state information thus outputted is used for control of the next frame.

The communication state information thus transmitted is received by the communication unit 104 of the transmitting device (communication state acquisition S106a). The communication state information thus received is outputted to the control unit 103. The control unit 103 serves to determine thinning amount of the next frame on the basis of communication state information (thinning amount control S107a). Information indicating thinning amount determined by the control unit 103 is outputted to the image data thinning unit 102. The content of the processing of the first frame has been descried above.

When the communication state deteriorates and a communication error takes place, an image signal re-sending request is sent to the transmitting device from the receiving device. This re-sending request is included in the communication state information. The transmitting device receives the re-sending request from the receiving device and once again carries out the above-mentioned operation.

Subsequently, processing of the second frame is started. In the transmitting device, image signal of RGB (second frame) outputted from the imaging module 101 is inputted to the color space transforming unit 106 (image signal input S100b). The image signal inputted to the color space transforming unit 106 is transformed into YCbCr signal. The YCbCr signal thus obtained is inputted to the image data thinning unit 102 (color space transform S101b). The image data thinning unit 102 executes thinning processing of image signal on the basis of thinning amount determined in the previous frame.

In the thinning processing, it is assumed that an image signal is thinned by, e.g., YUV422 format or YUV422 format.

FIG. 4 shows thinning processing by the YUV422 format. Pixels of a Y signal serving as a luminance signal are not thinned, whereas pixels of Cb signal and Cr signal serving as color difference signal are thinned every other pixel. Moreover, FIG. 5 shows thinning processing by YUV420 format. Pixels of Y signal serving as luminance signal are not thinned, whereas pixels of Cb signal and Cr signal serving as color difference signal are thinned every other pixel on the same line, and all pixels are thinned every other line. In addition, in the case where it is judged on the basis of communication state information that the communication state is good, control is made such that thinning processing is not performed.

In a manner stated above, an image signal in which pixels are thinned is outputted to the communication unit 104. The communication unit 104 transmits an image signal with CRC data being added thereto similarly to the first frame (image signal transmission S103*b*).

In the receiving device, the communication unit 202 receives an image signal which has been transmitted from the transmitting device (image signal reception S104*b*). The received image signal is outputted to the image data interpolating unit 204 and the image data storage unit 205. The image data storage unit 205 stores an image signal (image signal storage S111*b*). Moreover, the image data interpolating unit 204 executes interpolation processing of image signal (interpolation processing S105*b*). In this interpolation processing, the control unit 207 controls interpolation data amount on the basis of communication state information so that data amount to be interpolated becomes equal to the same as the thinned data amount. Moreover, in the case where color difference is thinned on the basis of YUV format 420 shown in FIG. 5, data is interpolated by using an image signal before several lines stored in the image data storage unit 205.

An interpolated image signal is outputted to the display unit 206. The display unit 206 displays an image of the second frame on the basis of the image signal (display S106*b*). At this time, thinning amount of an image displayed at present (interpolation amount) is displayed on the display unit on the basis of the communication state information of the first frame.

On the other hand, similarly to the first frame, the communication unit 202 analyzes CRC data given to a received image signal to output the analysis result to the communication state detecting unit 203. The communication state detecting unit 203 detects error on the basis of the analysis result to thereby detect communication state to generate communication state information (communication state detection S107*b*). The communication state information thus generated is outputted to the communication unit 202, and is transmitted to the transmitting device by the communication unit 202. In addition, the communication state information is also outputted to the control unit 207. Thus, communication state information is used for control of the next frame.

The transmitted communication state information is received by the communication unit 104 of the transmitting device (communication state acquisition 108*b*). The communication state information thus received is outputted to the control unit 103. The control unit 103 determines thinning amount of the next frame on the basis of the communication state information (thinning amount control S109*b*). Information indicating thinning amount determined by the control unit 103 is outputted to the image data thinning unit 102. The content of the processing of the second frame has been described above. At times subsequent thereto, processing similar to the second frame is repeated.

When the communication state deteriorates in the second frame or times subsequent thereto and a communication error takes place, an image signal re-sending request is sent to the transmitting device from the receiving device similar to the first frame. This re-sending request is included in the communication state information. The transmitting device receives the re-sending request from the receiving device and once again carries out the above-mentioned operation.

As described above, in accordance with this embodiment, since the communication time of data can be reduced by reducing the data amount of an image signal at the transmitting device, there is room for the re-sending of data when a communication error takes place and the number of times of re-sending the image signal increases. Thus, even in the case where the communication state becomes poor, it is possible to prevent the loss of image data as much as possible and perform transmission of an image signal of one frame within a predetermined time. Also, by restoring the data amount of an image signal at the receiving device, it is possible to keep any deterioration in picture quality of an image down to the minimum level. In addition, the thinning amount (interpolation amount) of an image serving as an index of the communication state is displayed on the display unit so that an operator can recognize the present communication state.

Various modifications and changes may be implemented to this embodiment. For example, while thinning processing is implemented to an image signal on the basis of YUV422 format or YUV420 format in this embodiment, thinning processing may be implemented to an image signal on the basis of formats except for the above (YUV411, etc.). In addition, there may also be employed such an approach to discriminate the communication state by level, whereby when the communication state is degraded, thinning processing is performed on the basis of YUV420 format, while when the communication state is degraded to some degree, thinning processing is performed on the basis of YUV422 format.

Second Embodiment

A second embodiment of the present invention will now be described. An image communication apparatus according to this embodiment is also composed of a transmitting device and a receiving device. In this embodiment, as a processing for reducing data amount of an image signal, Knee processing for reducing the number of data bits of an image signal is performed at the transmitting device. Moreover, as a processing for restoring data amount of an image signal, Deknee processing for restoring the number of data bits which have been reduced at the transmitting device is performed at the receiving device. At the time of conventional JPEG compression, transform processing from color space into frequency space is performed. On the contrary, Knee processing of this embodiment is performed with color space of an image signal being maintained.

Figure 6:
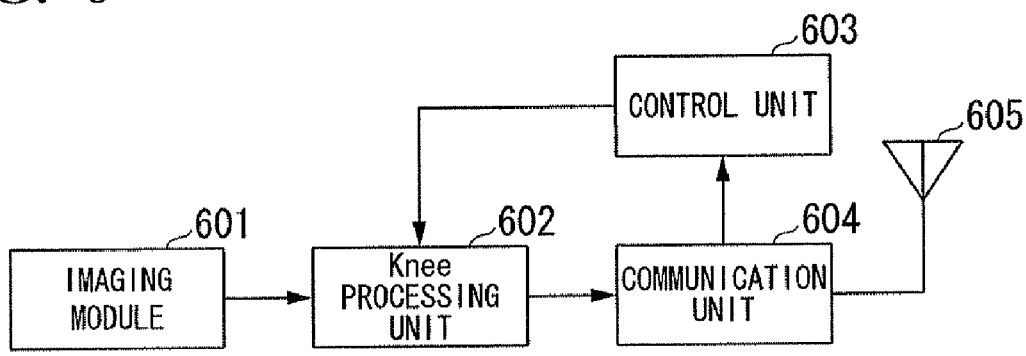
FIG. 6 is a block diagram showing the configuration of a transmitting device that an image communication apparatus according to a second embodiment of the present invention has.

FIG. 6 shows the configuration of the transmitting device. As shown in FIG. 6, the transmitting device comprises an imaging module 601, a Knee processing unit 602, a control unit 603, a communication unit 604 and an antenna 605. The imaging module 601 comprises image pickup devices, and serves to pick up an image of an object to generate an image signal. The Knee processing unit 602 generates, from an image signal generated by the imaging module 601, an image signal of which the number of bits has been reduced by the Knee processing. The control unit 603 controls the Knee processing unit 602 in accordance with the communication state. The communication unit 604 performs modulation processing of an image signal to be transmitted to the receiving device, and performs demodulation processing of the communication state information received from the receiving device. The antenna 605 performs transmission/reception of electric waves to and from the receiving device.

Figure 7:
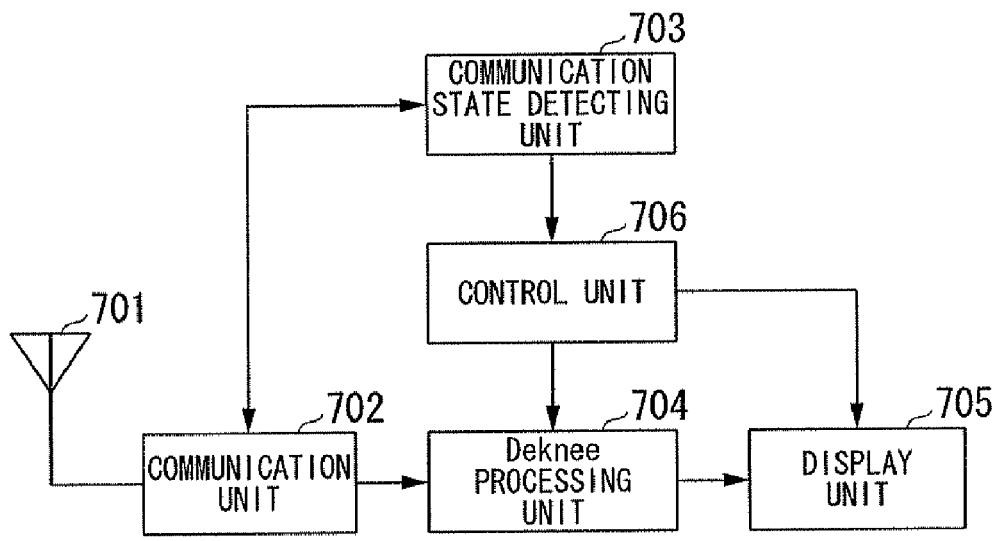
FIG. 7 is a block diagram showing the configuration of a receiving device that an image communication apparatus according to the second embodiment of the present invention has.

FIG. 7 shows the configuration of the receiving device. As shown in FIG. 7, the receiving device comprises an antenna 701, a communication unit 702, a communication state detecting unit 703, a Deknee processing unit 704, a display unit 705, and a control unit 706. The antenna 701 performs transmission/reception of electric waves to and from the transmitting device. The communication unit 702 performs demodulation processing of an image signal received from the transmitting device, and performs modulation processing of communication state information transmitted to the transmitting device. The communication state detecting unit 703 detects the communication state on the basis of data added to a received image signal to generate communication state information indicating the content of that communication state. The Deknee processing unit 704 generates, from the received image signal, an image signal of which the number of bits has been restored by the Deknee processing. The display unit 705 displays an image on the basis of an image signal in which restoration of the number of data bits has been performed by the Deknee processing unit 704. The control unit 706 controls the Deknee processing unit 704 in accordance with the communication state.

Figure 8:
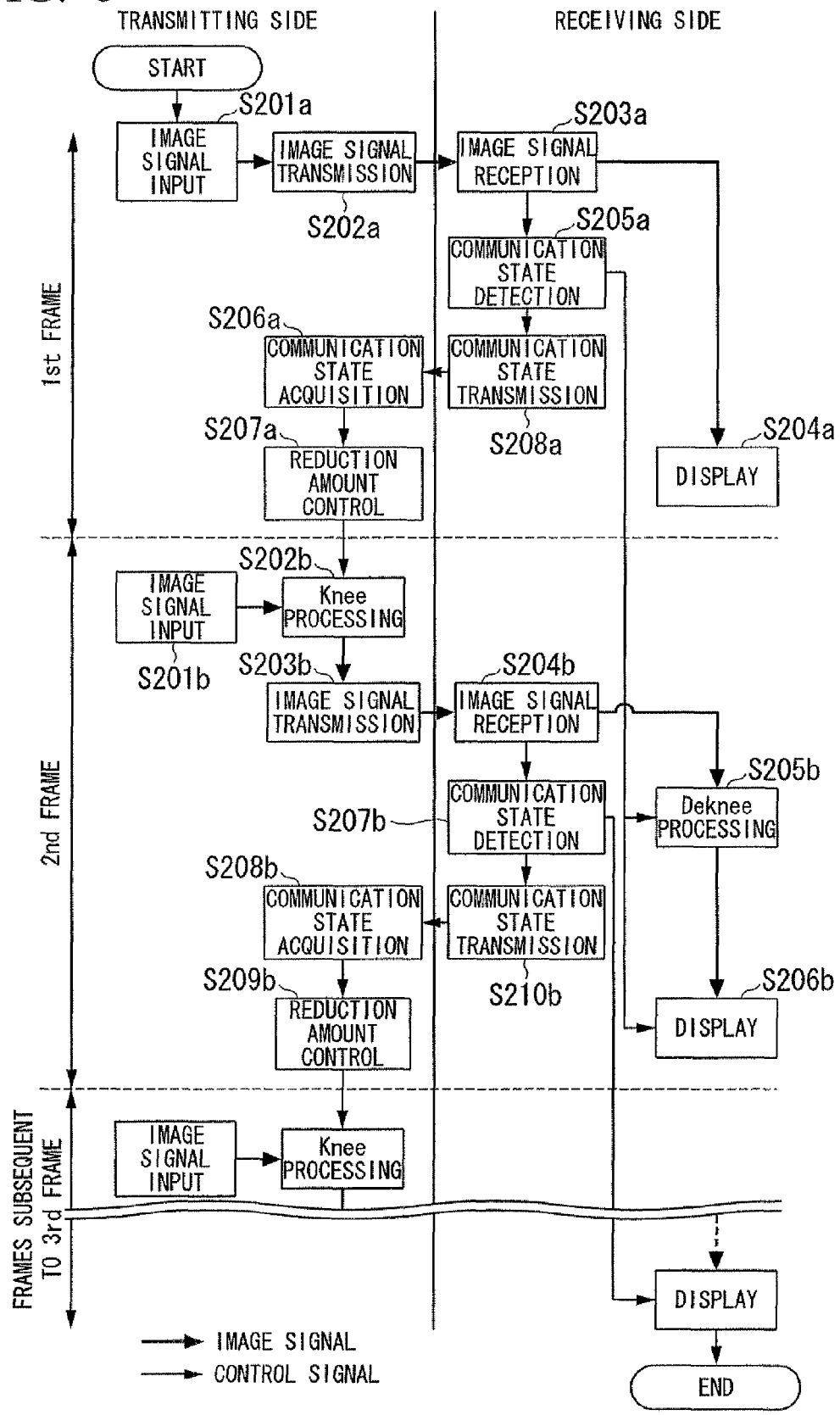
FIG. 8 is a flowchart showing the flow of the operation of the image communication apparatus according to the second embodiment of the present invention.

The operation of the image communication apparatus according to this embodiment will now be described. FIG. 8 shows the flow of the operation at the time of image communication. After starting, based on Turning On of the power supply in the transmitting device and the receiving device, generation of an image signal by the imaging module 601 is started in the transmitting device. The image signal (the first frame) of RGB outputted from the imaging module 601 is inputted to the Knee processing unit 602 (image signal input S201a). For the first frame, the Knee processing unit 602 outputs an image signal to the communication unit 604 without performing the Knee processing. The communication unit 604 transmits the image signal to the receiving device through the antenna 605 (image signal transmission S202a). In transmitting the image signal, CRC data by a well-known technology is added to the image signal in order to detect the communication state at the receiving device.

In the receiving device, the communication unit 702 receives, through the antenna 701, an image signal transmitted from the transmitting device (image signal reception S203a). The received image signal is outputted to the Deknee processing unit 704. For the first frame, the Deknee processing unit 704 outputs an image signal to the display unit 705 without performing the Deknee processing for the first frame. The display unit 705 displays an image of the first frame on the basis of the image signal (display S204a).

On the other hand, the communication unit 702 analyzes CRC data given to the received image signal to output the analysis result to the communication state detecting unit 703. The communication state detecting unit 703 detects an error on the basis of the analysis result to thereby detect the communication state to generate communication state information (communication state detection S205a). The communication state information thus generated is outputted to the communication unit 702, and is transmitted to the transmitting device by the communication unit 702 (communication state transmission S208a). In addition, the communication state information is also outputted to the control unit 706. Thus, the communication state information thus outputted is used for control of the next frame.

The transmitted communication state information is received by the communication unit 604 of the transmitting device (communication state acquisition S206a). The communication state information thus received is outputted to the control unit 603. The control unit 603 determines a data thinning amount of the next frame (the reduced number of bits) on the basis of the communication state information (thinning amount control S207a). Information indicating the data reduction amount determined by the control unit 603 is outputted to the Knee processing unit 602. The content of the processing of the first frame has been described above.

Subsequently, processing of the second frame is started. In the transmitting device, an image signal of RGB (second frame) outputted from the imaging module 601 is inputted to the Knee processing unit 602 (image signal input S201b). The Knee processing unit 602 executes Knee processing of an image signal on the basis of the data reduction amount determined in the previous frame.

Figure 9:
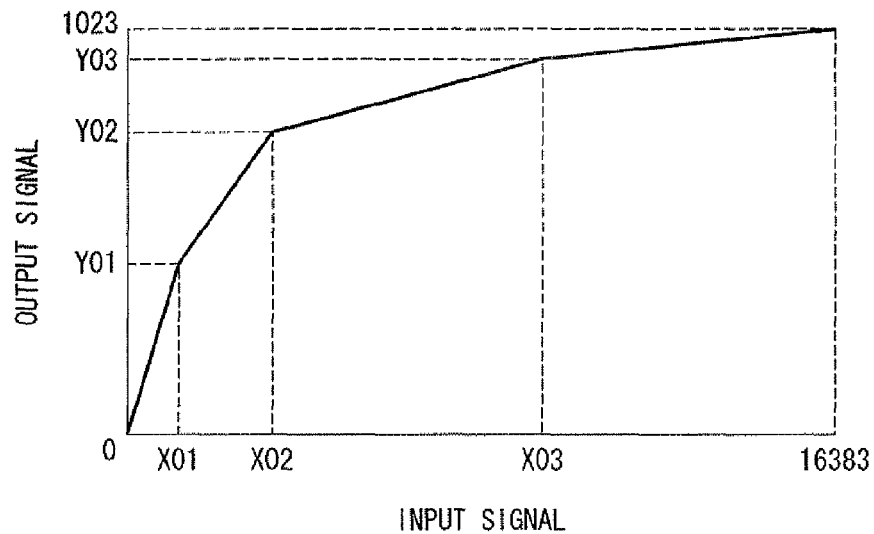
FIG. 9 is a reference block diagram for explaining Knee processing in the second embodiment of the present invention.

In this instance, the Knee processing unit 602 executes the Knee processing in accordance with the Table indicating the correspondence relationship between an image signal before Knee processing (input signal) and an image signal after the Knee processing output signal (output signal). FIG. 9 shows an example of the content of the Table used in the Knee processing. In the example shown in FIG. 9, an image signal of 14 bits (input signal) is transformed into an image signal of 10 bits (output signal). In addition, a number of inflection points of transform characteristic are three.

The image signal of which the number of data bits has been reduced in a manner stated above is outputted to the communication unit 604. The communication unit 604 serves to add CRC data similarly to the first frame to transmit an image signal thus obtained (image signal transmission S203b).

In the receiving device, the communication unit 702 receives an image signal transmitted from the transmitting device (image signal reception S204b). The image signal thus received is outputted to the Deknee processing unit 704. The Deknee processing unit 704 executes Deknee processing of an image signal (Deknee processing S205b).

Figure 10:
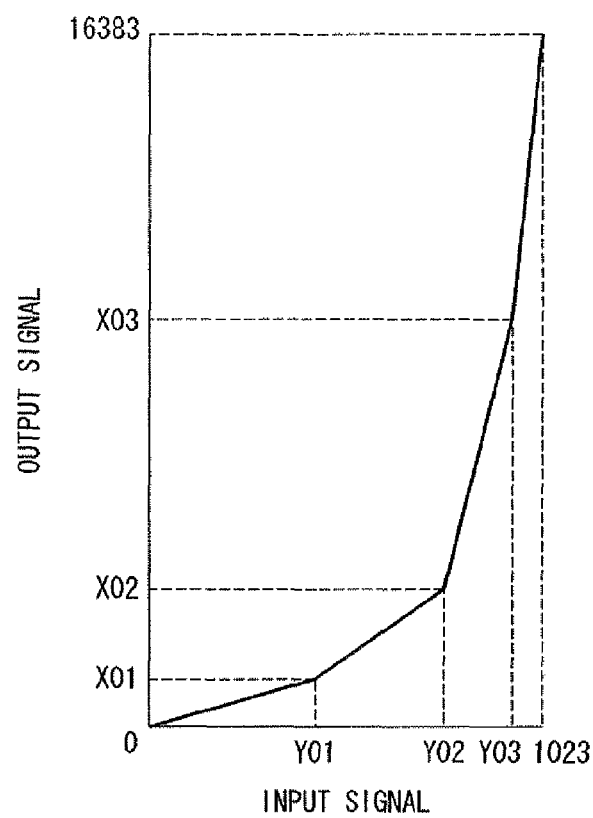
FIG. 10 is a reference block diagram for explaining Deknee processing in the second embodiment of the present invention.

In this instance, the Deknee processing unit 704 executes Deknee processing in accordance with the Table indicating the correspondence relationship between an image signal before Deknee processing (input signal) and the image signal after Deknee processing (output signal). FIG. 10 shows an example of the content of the Table used for Deknee processing. In the example shown in FIG. 10, an image signal (input signal) of 10 bits is transformed into an image signal (output signal) of 14 bits. Moreover, the number of inflection points of transform characteristic are three. Moreover, in the Deknee processing, the control unit 706 controls the restoration data amount on the basis of communication state information so that the number of data bits to be restored becomes equal to that of the reduced number of data bits.

An image signal after undergoing the Deknee processing is outputted to the display unit 705. The display unit 705 displays an image of the second frame on the basis of the image signal (display S206b). At this time, the reduction amount (restoration amount) of an image display displayed at present is displayed on the display unit 705 on the basis of communication state information of the first frame.

On the other hand, similarly to the first frame, the communication unit 702 analyzes CRC data given to the received image signal to output the analysis result to the communication state detecting unit 703. The communication state detecting unit 703 detects an error on the basis of the analysis result to thereby detect the communication state to generate communication state information (communication state detection S207b). The communication state information is outputted to the communication unit 702, and is transmitted to the transmitting device by the communication unit 702 (communication state transmission S210b). Moreover, the communication state information is also outputted to the control unit 207. The communication state information thus obtained is used for control of the next frame.

The transmitted communication state information is received by the communication unit 604 of the transmitting device (communication state acquisition S208b). The received communication state information is outputted to the control unit 603. The control unit 603 determines, on the basis of the communication information, a data reduction amount of the next frame (reduction amount control S209b). Information indicating the data reduction amount determined by the control unit 603 is outputted to the Knee processing unit 602. The content of processing of the second frame has been described above. At times subsequent thereto, processing similar to the processing of the second frame is repeated.

As described above, in accordance with this embodiment, since the communication time of data can be reduced by reducing the data amount of an image signal by the Knee processing at the transmitting device, there is room for the re-sending of data when a communication error takes place and the number of times of re-sending the image signal increases. Thus, even in the case where the communication state becomes poor, it is possible to prevent the loss of image data as much as possible and perform transmission of an image signal of one frame within a predetermined time. Also, by restoring the data amount of an image signal by the Deknee processing at the receiving device, it is possible to keep any deterioration in picture quality of an image down to the minimum level. In addition, a data reduction amount serving as index of the communication state is displayed on the display unit so that an operator can recognize the present communication state.

Figure 16:
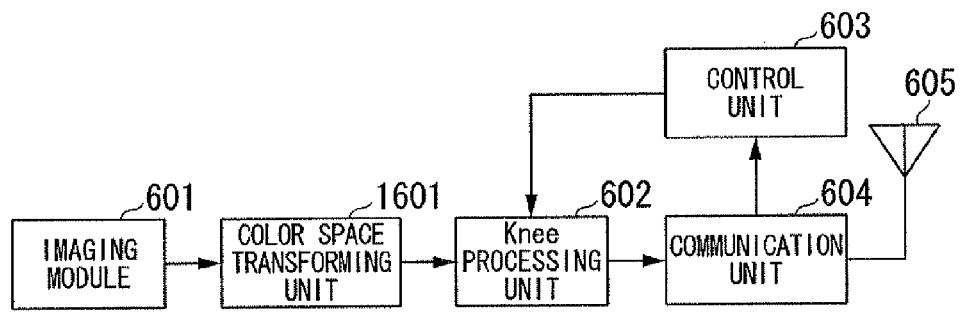
FIG. 16 is a block diagram showing another configuration of the transmitting device that the image communication apparatus according to the second embodiment of the present invention has.
Figure 17:
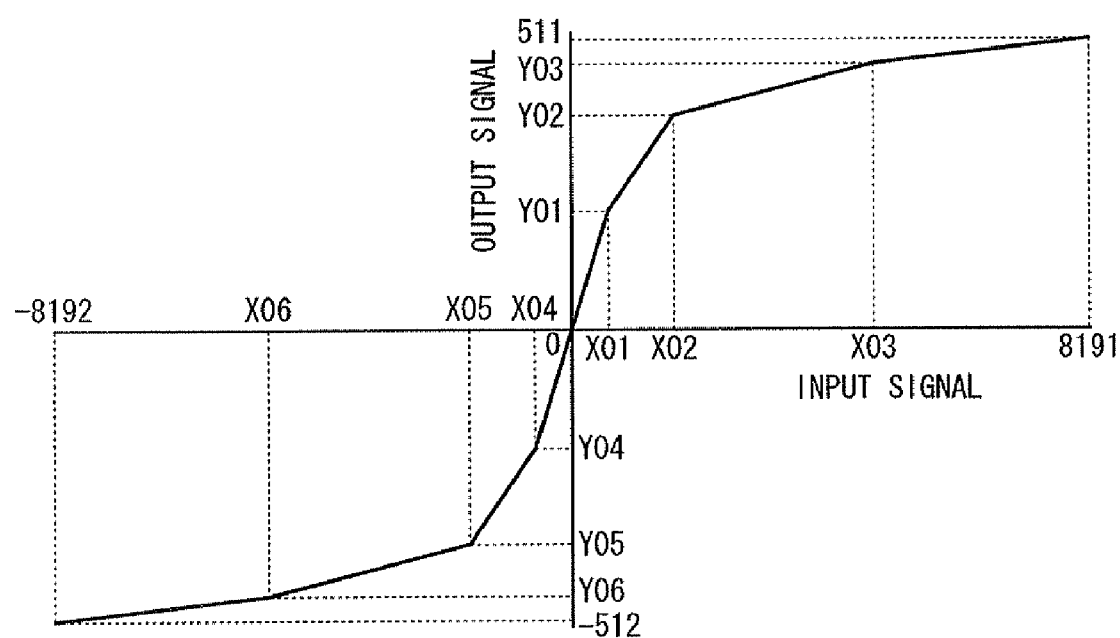
FIG. 17 is a reference block diagram for explaining Knee processing in the second embodiment of the present invention.
Figure 18:
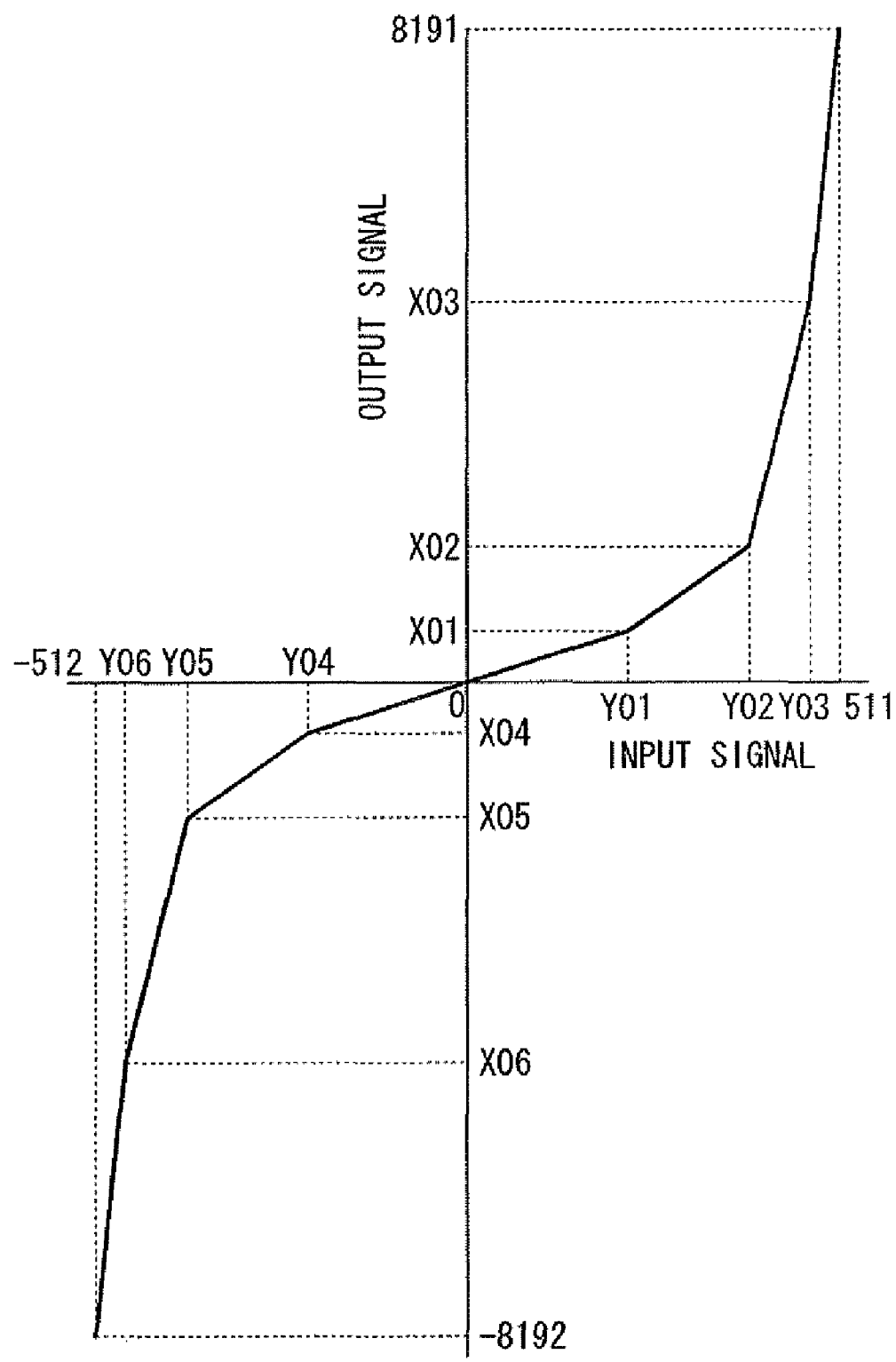
FIG. 18 is a reference block diagram for explaining Deknee processing in the second embodiment of the present invention.

Various modifications and changes may be implemented to this embodiment. For example, in this embodiment, the Knee processing and the Deknee processing are implemented on an image signal of ROB, whereas the Knee processing and the Deknee processing may be implemented on a YCbCr signal. FIG. 16 shows the configuration of the transmitting device for performing the Knee processing on a YCbCr signal. To the configuration shown in FIG. 6 is added a color space transforming unit 1601 for transforming the image signal of RGB generated by the imaging module 101 to a YCbCr signal. When the transmitting device performs the Knee processing, the table shown in FIG. 7 may be used. Also, when the receiving device performs the DeKnee processing, the table shown in FIG. 18 may be used.

Moreover, in the Knee processing, it is not necessary to allow data reduction quantities of respective components of R component, G component and B component, and Y component, Cb component and Cr component to be uniform. For example, there may be also employed an approach to reduce the data reduction amount of the Y component according to luminance, and to increase the data reduction amount of the Cr component and Cb component according to color difference.

Moreover, while the number of the inflection point of transform characteristic in the Knee processing and the Deknee processing is caused to be three, the number of inflection points may be three or more in order to enhance reproducibility at the restoration time, or may be larger than three. Further, there may be employed an approach to discriminate the communication state by level to switch reduction processing of the data amount at multi stages, e.g., an approach to allow the number of data bits from 14 bits to 8 bits or 10 bits, etc. in accordance with the communication state. Similarly, there may be employed such an approach to switch, at multi stages, restoration processing of the data amount in accordance with the communication state.

Figure 11:
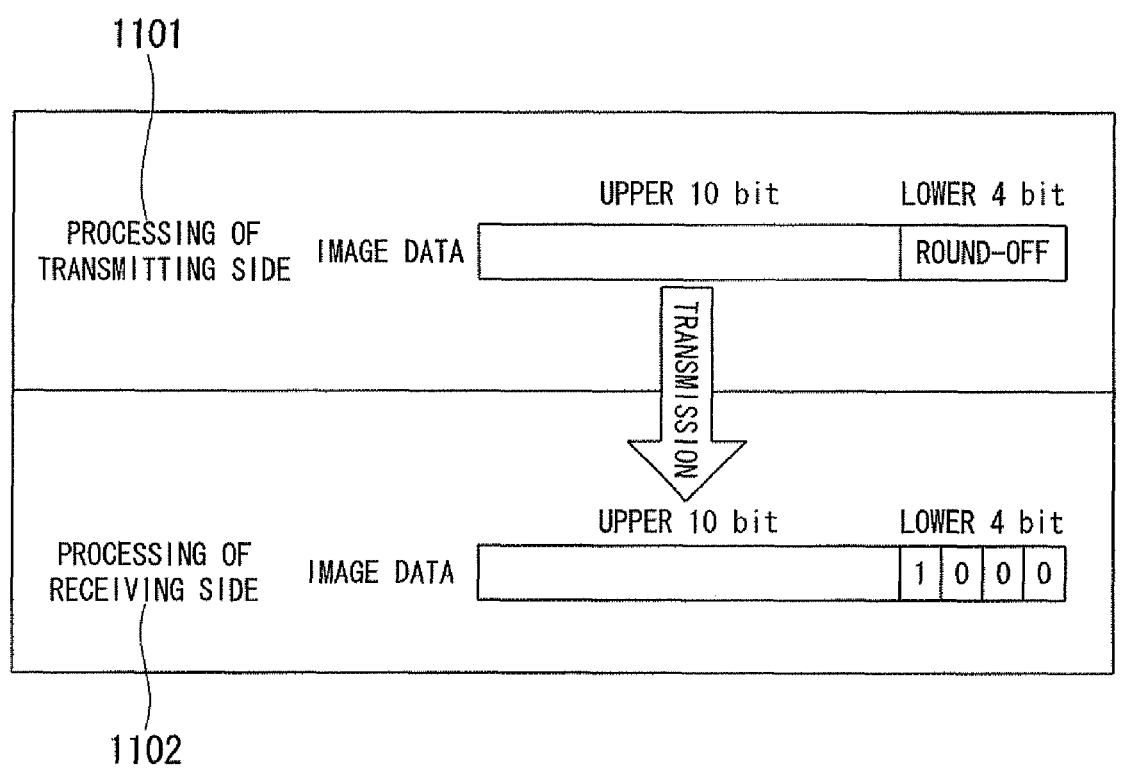
FIG. 11 is a reference block diagram for explaining a modified example of the second embodiment of the present invention.

A modified example of this embodiment will now be described with reference to FIG. 11. Processing 1101 of the transmitting side shown in FIG. 11 is a processing to extract data of upper 10 bits of data of 14 bits constituting an image signal to transmit the data thus extracted. Moreover, processing 1102 of the receiving side is a processing to interpolate lower 4 bits of data constituting a received image signal. In interpolation, '1' is interpolated for MSB1 bit of lower 4 bits and '0' is interpolated for LSB3 bits. The lower 4 bits are interpolated as described above so that a maximum error between image data of the transmitting side and image data of the receiving side becomes equal to $2^{4-1}$ (=8). As a result, the error becomes small as compared to the maximum error $2^4-1$ (=15) in the case where '0' is interpolated for '0'. Accordingly, it is possible to keep any deterioration in picture quality down to the minimum level. In addition, since this modified example can be realized by a small scale circuit, circuit scale reduction can be also advantageously provided.

Third Embodiment

A third embodiment of the present invention will now be described. The image communication apparatus according to this embodiment is also composed of a transmitting device and a receiving device. In this embodiment, as a processing for reducing the data amount of an image signal, there is performed at the transmitting device a processing for reducing, from an image signal consisting of respective colors of R, G, B generated in the imaging system of the three types of imaging devices, either one of respective color signals every pixel. Namely, in the image signal generated in the imaging system of the three types of imaging devices, three color signals of R, G, B are assigned to respective pixels. In this case, the transmitting device generates Bayer data from this image signal. Thus, the number of colors per one pixel is changed from 3 to 1. As a result, the data amount is reduced. Moreover, as a processing for restoring the data amount of an image signal, a processing for interpolating a color signal reduced at the transmitting device is performed at the receiving device. At the time of conventional JPEG compression, transform processing from color space to frequency space is performed. On the contrary, processing of this embodiment is performed with color space of an image signal being maintained.

Figure 12:
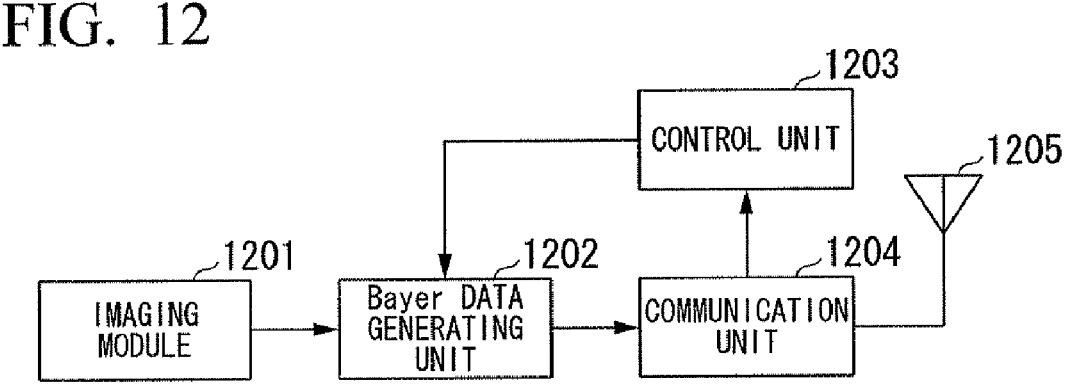
FIG. 12 is a block diagram showing the configuration of a transmitting device that an image communication apparatus according to a third embodiment of the present invention has.

FIG. 12 shows the configuration of a transmitting device. As shown in FIG. 12, the transmitting device comprises an imaging module 1201, a Bayer data generating unit 1202, a control unit 1203, a communication unit 1204, and an antenna 1205. The imaging module 1201 comprises image pick-up devices, and serves to pick up an image to generate an image signal. The Bayer data generating unit 1202 generates an image signal consisting of Bayer data from an image signal generated by the imaging module 1201. The control unit 1203 controls the Bayer data generating unit 1202 in accordance with the communication state. The communication unit 1204 performs modulation processing of an image signal to be transmitted to the receiving device, and performs demodulation processing of the communication state information received from the receiving device. The antenna 1205 serves to perform transmission/reception of electric waves to and from the receiving device.

Figure 13:
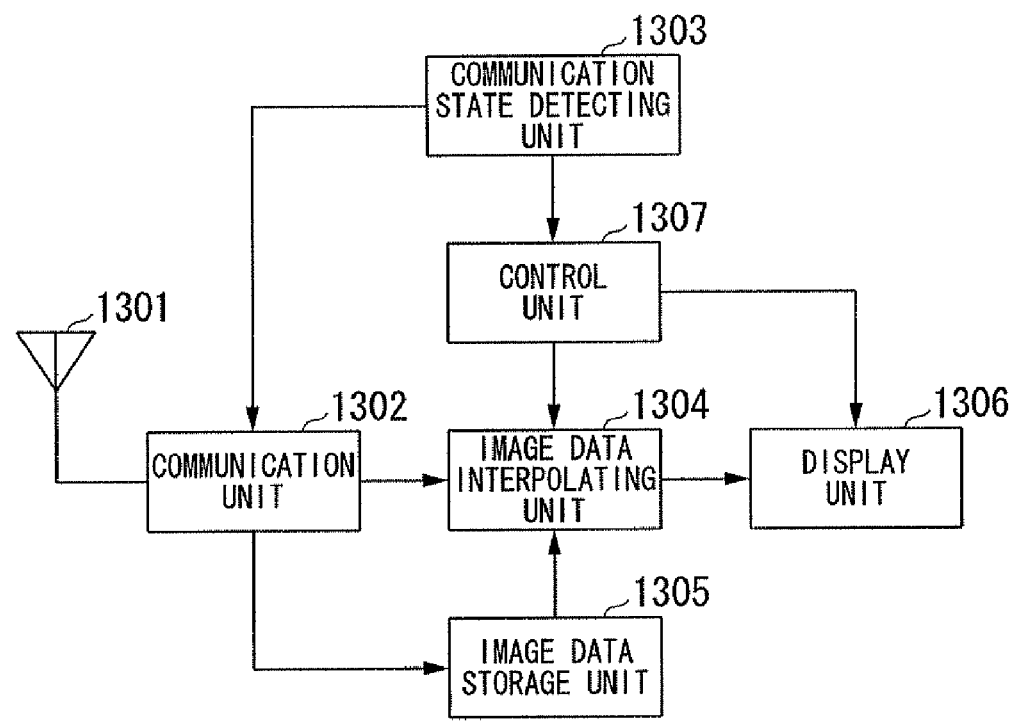
FIG. 13 is a block diagram showing the configuration of a receiving device that the image communication apparatus according to the third embodiment of the present invention has.

FIG. 13 shows the configuration of the receiving device. As shown in FIG. 13, the receiving device comprises an antenna 1301, a communication state detecting unit 1302, a communication state detecting unit 1303, an image data interpolating unit 1304, an image data storage unit 1305, a display unit 1306, and a control unit 1307. The antenna 1301 performs transmission/reception of electric waves to and from the transmitting device. The communication unit 1302 performs demodulation processing of an image signal received from the transmitting device, and performs modulation processing of the communication state information transmitted to the transmitting device. The communication state detecting unit 1303 detects the communication state on the basis of data added to the received image signal to generate communication state information indicating the content of the communication state. The image data interpolating unit 1304 generates, from the received image signal, an image signal in which a color signal reduced at the transmitting device is interpolated. The image data storage unit 1305 stores the received image signal. The display unit 1306 displays an image on the basis of the image signal in which interpolation of the color signal has been performed by the image data interpolating unit 1304. The control unit 1307 controls the image data interpolation unit 1304 in accordance with the communication state.

Figure 14:
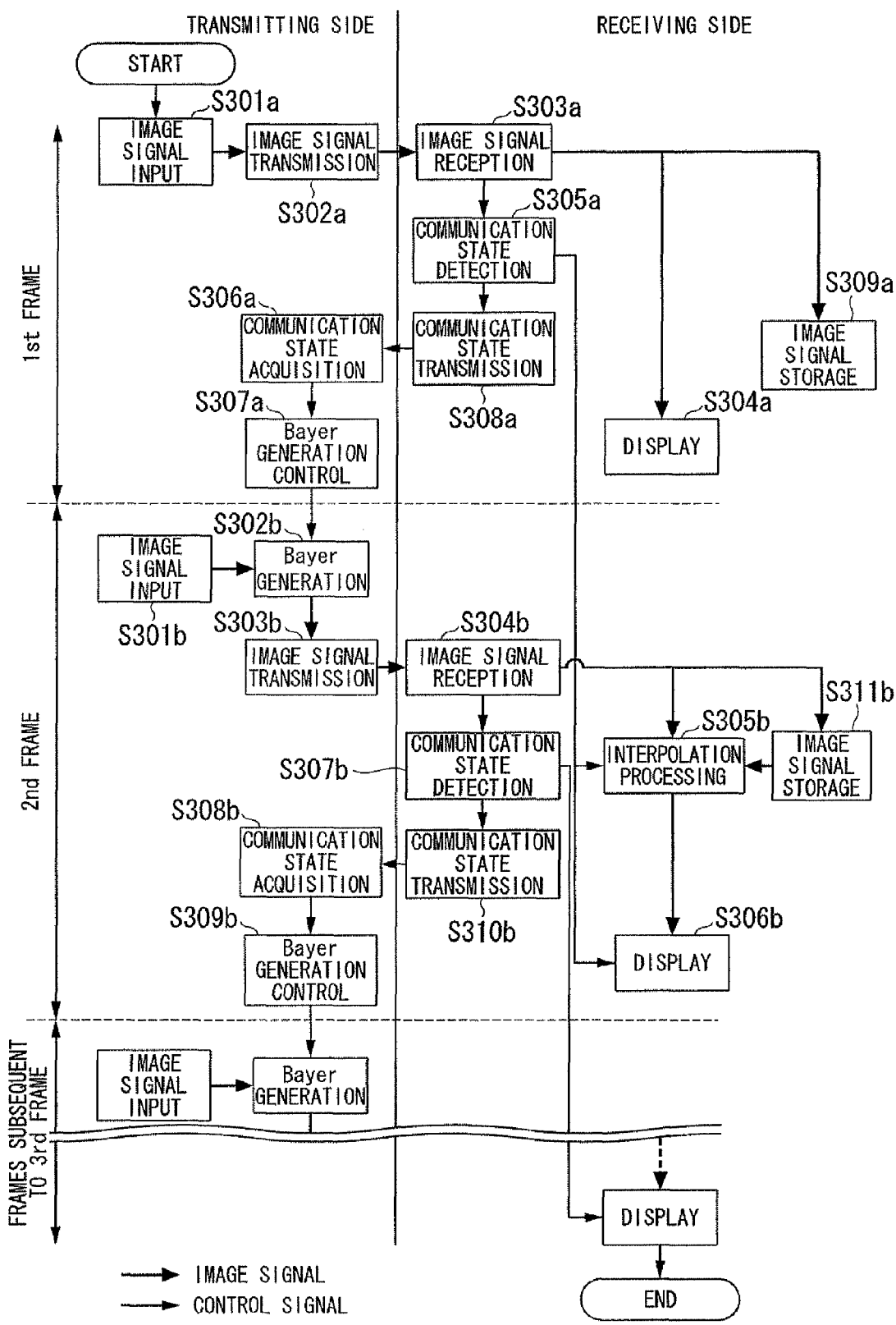
FIG. 14 is a flowchart showing the flow of the operation of the image communication apparatus according to the third embodiment of the present invention.

The operation of the image communication apparatus according to this embodiment will now be described. FIG. 14 shows the flow of the operation at the time of image communication. After starting due to Turning ON of the power supply in the transmitting device and the receiving device, generation of an image signal by the imaging module 1201 is started. An image signal (the first frame) of RGB outputted from the imaging module 1201 is inputted to the Bayer data generating unit 1202 (image signal input S301a). For the first frame, the Bayer data generating unit 1202 outputs an image signal to the communication unit 1204 without performing generation of Bayer data. The communication unit 1204 transmits, to the receiving device, the image signal through the antenna 1205 (image signal transmission S302a). In transmitting an image signal, CRC data by a well-known technology is added to the image signal in order to detect the communication state at the receiving device.

In the receiving device, the communication unit 1302 receives, through the antenna 1301, an image signal transmitted from the transmitting device (image signal reception S303a). The received image signal is outputted to the image data interpolating unit 1304 and the image data storage unit 1305. For the first frame, the image data interpolating unit 1304 outputs the image signal to the display unit 1306 without performing interpolation processing. The display unit 1306 displays an image signal of the first frame on the basis of the image signal (display S304a). In addition, the image data storage unit 1305 stores the image signal (image signal storage S309a)

On the other hand, the communication unit 1302 serves to analyze CRC data given to a received image signal to output the analysis result to the communication state detecting unit 1303. The communication state detecting unit 1303 detects an error on the basis of the analysis result to thereby detect the communication state to generate communication state information (communication state detection S305a). The communication state information is outputted to the communication unit 1302, and is transmitted to the transmitting device by the communication unit 1302 (communication state transmission S308a). Moreover, communication state information is also outputted to the control unit 1307. The communication state information thus outputted is used for control of the next frame.

The transmitted communication state information is received by the communication unit 1204 of the transmitting device (communication state acquisition S306a). The communication state information thus received is outputted to the control unit 1203. The control unit 1203 determines, on the basis of the communication state information, the control content of the next frame (as to whether or not generation of Bayer data is performed) (Bayer generation control S307a). The information indicating control content determined by the control unit 1203 is outputted to the Bayer data generating unit 1202. The content of the processing of the second frame has been described above.

Subsequently, processing of the second frame is started. In the transmitting device, an image signal of RGB (second frame) outputted from the imaging module 1201 is inputted to the Bayer data generating unit 1202 (image signal input S301b). The Bayer data generating unit 1202 executes processing on the basis of the control content determined in the previous frame (Bayer generation S302b).

In this instance, in the case where the communication state is good, the Bayer data generating unit 1202 outputs an image signal to the communication unit 1204 without performing generation of Bayer data. Moreover, in the case where the communication state is poor, the Bayer data generating unit 1202 performs generation of Bayer data to output, to the communication unit 1204, an image signal consisting of Bayer data. The communication unit 1204 serves to add CRC data similarly to the first frame to transmit an image signal thus obtained (image signal transmission S303b).

In the receiving device, the communication unit 1302 receives an image signal transmitted from the transmitting device (image signal reception S304b). The received image signal is outputted to the image data interpolating unit 1304 and the image data storage unit 1305. The image data storage unit 1305 stores the image signal thus outputted (image signal storage S311b). Moreover, the image data interpolating unit 1304 executes interpolation processing (demosaicing processing, etc.) of the image signal (interpolation processing S305b).

The image signal after undergoing interpolation processing is outputted to the display unit 1306. The display unit 1306 displays an image of the second frame on the basis of the image signal thus outputted (display S306b). At this time, information of an image displayed at present (information indicating as to whether or not generation of Bayer data is performed) is displayed on the display unit 1306.

On the other hand, similarly to the first frame, the communication unit 1302 analyzes CRC data given to the received image signal to output the analysis result to the communication state detecting unit 1303. The communication state detecting unit 1303 detects an error on the basis of the analysis result to thereby detect the communication state to generate communication state information (communication state detection S307b). The communication state information is outputted to the communication unit 1302, and is transmitted to the transmitting device by the communication unit 1302 (communication state transmission S310b). In addition, the communication state information is also outputted to the control unit 1307. The communication state information thus outputted is used for control of the next frame.

The transmitted communication state information is received by the communication unit 1204 of the transmitting device (communication state acquisition S308b). The received communication state information is outputted to the control unit 1203. The control unit 1203 determines the control content of the next frame on the basis of the communication state information (Bayer generation control 8309b). Information indicating the control content, which is determined by the control unit 1203, is outputted to the Bayer data generating unit 1202. The content of the processing of the second frame has been described above. At times subsequent thereto, processing similar to the processing of the second frame is repeated.

As described above, in accordance with this embodiment, since the communication time of data can be reduced by reducing the data amount of an image signal by the generation of Bayer data at the transmitting device, there is room for the re-sending of data when a communication error takes place and the number of times of re-sending the image signal increases. Thus, even in the case where the communication state becomes poor, it is possible to prevent the loss of image data as much as possible and perform transmission of an image signal of one frame within a predetermined time. Also, by restoring the data amount of an image signal by interpolation processing at the receiving device, it is possible to keep any deterioration in picture quality of an image down to the minimum level. In addition, information indicating as to whether or not generation of Bayer data is performed, which provides an index of the communication state, is displayed on the display unit so that an operator can recognize the present communication state.

While the embodiments of the present invention have been described in detail with reference to the attached drawings, practical configurations are not limited to the above-described embodiments, but design changes, etc., of the scope which does not depart from the gist of the present invention may be included. For example, there may be employed a configuration such that the first and the second embodiments are combined to thin components according to color differences of YCbCr signals to thereby further reduce data amount. Further, there may be employed a configuration such that the second and third embodiments are combined to generate Bayer data by an image signal outputted from the imaging system of three types of imaging devices to reduce the data amount of generated Bayer data.

Figure 15:
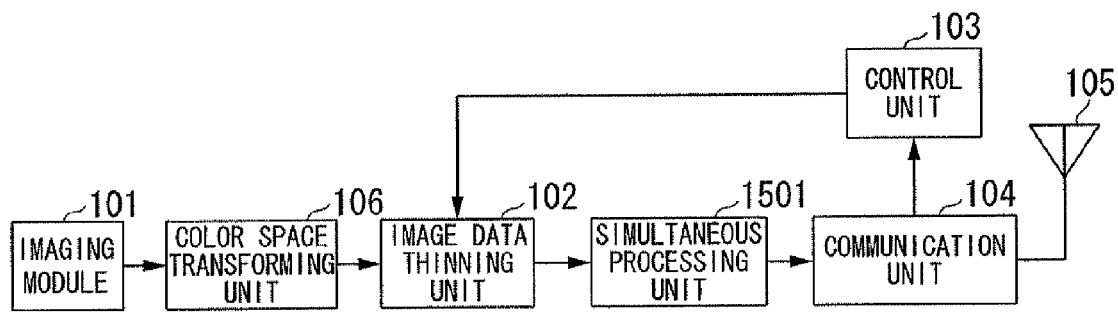
FIG. 15 is a block diagram showing the configuration in the case where the image communication apparatus according to each of the embodiments of the present invention is applied to an imaging system of the surface sequential system.

In addition, while the above-described respective embodiments are directed to imaging systems based on the simultaneous processing systems of three imaging sensors, there may be provided an imaging system using a surface sequential system. It should be noted that, in the case of the surface sequential system, it is necessary to perform simultaneous processing before transmission of image signals. FIG. 15 shows the configuration in the case where the transmitting device, which has been explained in the first embodiment, is applied to an imaging system of the surface sequential system. In FIG. 15, the same reference numerals are respectively the same components as the components shown in FIG. 1. As shown in FIG. 15, there may be inserted, between the image data thinning unit 102 and the communication unit 104, a simultaneous processing unit 1501 for allowing image signals outputted from the image data thinning unit 102 to be simultaneous.

While preferred embodiments of the invention have been described and illustrated above, it should be understood that they are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image communication apparatus including a transmitting device for transmitting an image signal, and a receiving device for receiving an image signal which has been transmitted by the transmitting device, the transmitting device comprising:
an image pick-up unit for picking up an image of an object to generate an image signal;
an information receiving unit for receiving communication state information indicating a communication state which has been transmitted from the receiving device;
a transmitting side signal processing unit for generating an image signal in which a data amount is reduced on color space from an image signal which has been generated from the image pick-up unit;
a signal transmitting unit for transmitting, to the receiving device, an image signal which has been generated by the transmitting side signal processing unit; and
a transmitting side control unit for controlling the transmitting side signal processing unit on the basis of the received communication state information;

the receiving device comprising:
a signal receiving unit for receiving an image signal which has been transmitted by the transmitting device;
a receiving side signal processing unit for generating, from the received image signal, an image signal of which the data amount has been restored on the color space;
a communication state detecting unit for detecting communication state;
a receiving side control unit for controlling the receiving side signal processing unit on the basis of the communication state information indicating communication state which has been detected by the communication state detecting unit; and
an information transmitting unit for transmitting the communication state information to the transmitting device.

2. The image communication apparatus according to claim 1,
wherein the transmitting side signal processing unit serves to generate an image signal in which pixel or pixels is or are thinned from an image signal which has or have been generated by the image pick-up unit, and
the receiving side signal processing unit serves to generate an image signal in which the pixel or pixels which has or have been thinned at the transmitting device has or have been interpolated from a received image signal.

3. The image communication apparatus according to claim 1,
wherein the transmitting side signal processing unit serves to generate an image signal in which the number of data bits has been reduced from an image signal which has been generated by the image pick-up unit, and
the receiving side signal processing unit generates an image signal in which the number of bits, which has been reduced at the transmitting device, is restored from the received image signal.

4. The image communication apparatus according to claim 1,
wherein the transmitting side signal processing unit serves to generate an image signal from which any color signal has been reduced from the plural color signals, every pixel from an image signal consisting of plural color signals which have been generated by the image pick-up unit, and
the receiving side signal processing unit serves to generate an image signal in which the color signal, which has been reduced at the transmitting device, is restored from the received image signal.

5. The image communication apparatus according to either one of claims 1 to 4, wherein the receiving device further comprises:

a display unit for displaying information as an index of the communication state on the basis of the communication state information.

6. The image communication apparatus according to claim 1 further comprising a color space transforming unit for transforming color space of an image signal generated by the image pick-up device, wherein the transmitting side signal processing unit generates an image signal in which the data amount is reduced on color space from an image signal for which color space has been transformed by the color space transforming unit.

* * * * *